United States Patent [19]

Choi

[11] Patent Number: 5,758,408
[45] Date of Patent: Jun. 2, 1998

[54] APPARATUS FOR AUOMATICALLY PRESS-FITTING A TURNTABLE

[75] Inventor: Young-Suk Choi, Seoul, Rep. of Korea

[73] Assignee: Daewoo Electronics Co., Ltd., Seoul, Rep. of Korea

[21] Appl. No.: 704,984

[22] Filed: Aug. 29, 1996

[30] Foreign Application Priority Data

Aug. 31, 1995 [KR] Rep. of Korea ............ 95-28014
Aug. 31, 1995 [KR] Rep. of Korea ............ 95-28015

[51] Int. Cl.⁶ .................................................. B23P 19/00
[52] U.S. Cl. .................. 29/732; 29/564.1; 29/736; 29/598; 369/263
[58] Field of Search ............................ 29/564.1, 597, 29/598, 705, 7.1, 732, 736; 369/39, 44.1 S, 258, 263

[56] References Cited

U.S. PATENT DOCUMENTS 5,363,546  11/1994  Bradtmeuller ............ 29/564.1

Primary Examiner—W. Donald Bray
Attorney, Agent, or Firm—Beveridge, DeGrandi, Weilacher & Young LLP

[57] ABSTRACT

An apparatus for automatically press-fitting a turntable has driving motor attachably/detachably installed to/from a driving motor fixing part. A turntable assembly fixing part is attachably/detachably installed with a turntable assembly and arranged to allow a rotating shaft of the turntable assembly to be exactly coaxial with a motor shaft of the driving motor. An insertion lug is formed at a lower surface of the turntable assembly fixing part to be fitted/separated into/from a groove in an upper corresponding surface of a turntable. A motor shaft fixing part arranged to an upper portion of a drive chassis coupled to the driving motor includes a stand portion formed with an elongated guide hole for receiving/separating the motor shaft and a motor shaft supporting portion which has a sidewall upwardly bent to perpendicularly extend from an edge of the elongated guide hole of the stand portion. The motor shaft supporting part grips to fix around the motor shaft while press-fitting the motor shaft into the turntable assembly to prevent warpage of the motor shaft caused by the press-fitting force in the axial direction.

8 Claims, 5 Drawing Sheets

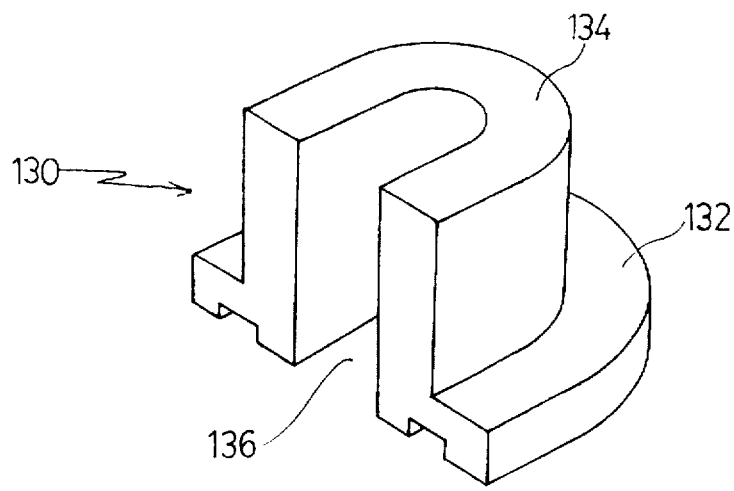
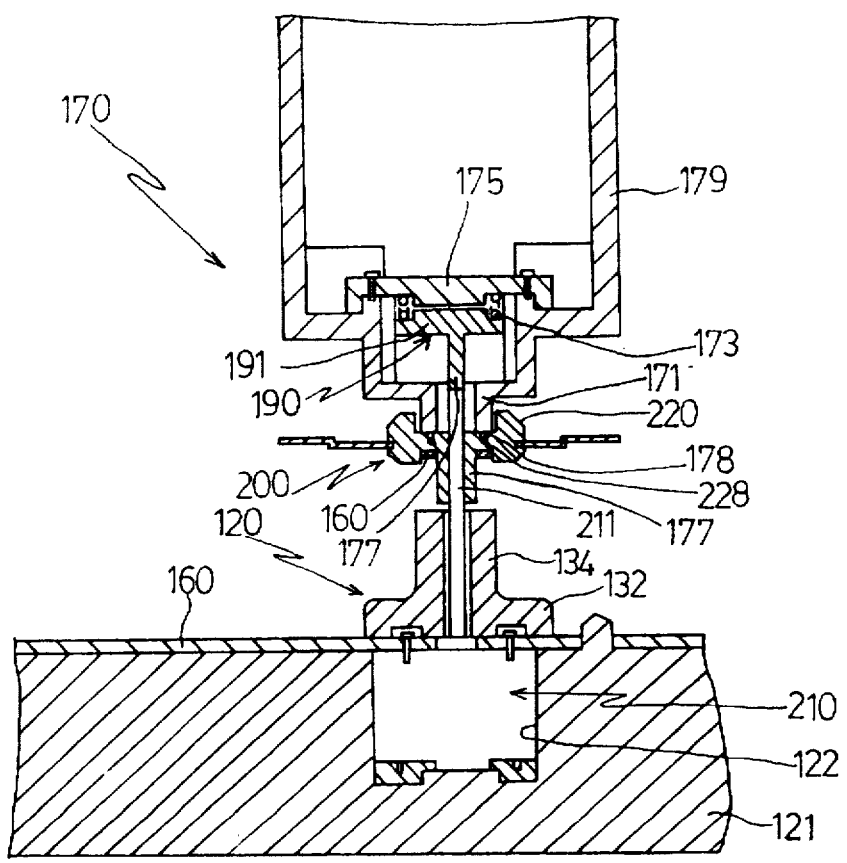

APPARATUS FOR AUOMATICALLY PRESS-FITTING A TURNTABLE

BACKGROUND OF THE INVENTION

1. Field of the Invention

The present invention relates to an apparatus for automatically press-fitting a turntable, and more particularly to an apparatus for automatically press-fitting a turntable capable of minimizing an eccentric error by inserting a rotating shaft of a driving motor into a turntable assembly with significantly high precision.

2. Description of the Prior Art

Generally, an appliance such as optical video disc players, digital audio disc players and compact disc players is an apparatus for performing recording or reproducing operation with respect to a disc capable of magnetic recording or optical recording. In these appliances, the disc containing various audio signals or video signals is mounted to a turntable assembly of a corresponding disc player, and then the information is reproduced while rotating the disc by using the turntable assembly. U.S. Pat. Nos. 5,228,023 and 4,771,971 disclose examples of a construction and manufacturing method of the conventional turntable assembly.

The conventional turntable assembly will be described with reference to FIGS. 1 and 2 below.

FIG. 1 is an exploded perspective view showing the conventional turntable assembly, and FIG. 2 is a sectional view showing a joining state that the conventional turntable assembly is press-fitted into a driving motor.

Here, a reference numeral 10 denotes a spindle motor as a driving motor which is formed with a motor shaft 11 at an upper portion thereof. A supporting shaft member 20 is integrally formed with a cylindrical core portion 21 fitted with spindle motor shaft 11 and a supporting portion 22 for supporting a disc stand member 30. A plurality of insertion holes 24 are formed in the bottom plane of supporting portion 22 which has a circular groove 23 along the outer circumference thereof. Disc stand member 30 is shaped as a disc having an opening 32 in the center for receiving supporting shaft member 20 therethrough. The inner periphery of disc stand member 30 is engaged into outer circular groove 23 in supporting portion 22 of supporting shaft member 20. Disc stand member 30 is formed with a bending portion 31 which is upwardly bent for seating a disc thereon. A spring 60 is fitted to an upper portion of cylindrical core portion 21 of supporting shaft member 20. A pressing member 40 is put on cylindrical core portion 21 of supporting shaft member 20 coupled with spring 60. Pressing member 40 is formed with hook-like projections 41 directing downward to be respectively inserted to insertion holes 24 of supporting shaft member 20.

Then, as shown in FIG. 2, turntable assembly T is installed under the state of being inserted with motor driving shaft 11. While disc 50 is mounted to the upper portion of turntable assembly T, information within disc 50 can be reproduced by actuating the rotation of spindle motor 10.

As described above, turntable assembly T undergoes the assembling process under the state that spindle motor shaft 11 is forcibly press-fitted into cylindrical core portion 21 of supporting shaft member 20. A conventional apparatus for press-fitting the turntable employed for this process consists of a jig for holding the outer periphery of driving motor 10 at the lower side thereof and a magnetic chuck for electrically holding supporting shaft member 20 of turntable assembly T at the upper side thereof.

Under this state, the jig is moved upward and the magnetic chuck is moved downward to pressively fitting rotating shaft 11 of driving motor 10 fixed to the jig into the turntable fixed to the magnetic chuck, thereby assembling the elements.

In the above-mentioned conventional press-fitting process, however, when driving motor shaft 11 is press-fitted into cylindrical core portion 21 of supporting shaft member 20 of turntable assembly T, rotating shaft 11 of driving motor 10 is warped due to the press-fitting force exerting in the axial direction to cause an eccentric error around the motor shaft portion after finishing the press-fitting process. Furthermore, the outer periphery of driving motor 10 is held by means of the jig, and the outer periphery of turntable assembly T is held by means of the magnetic chuck to be highly probable to produce the eccentric error at the cylindrical core portion and motor shaft portion which are the center portion. For these reasons, turntable assembly T is not precisely joined with driving motor shaft 11 to be liable to shake cylindrical core portion 21 of turntable assembly T with the consequence of degrading playback accuracy when the disc is being reproduced.

SUMMARY OF THE INVENTION

It is an object of the present invention to provide an apparatus for automatically press-fitting a turntable capable of minimizing an eccentric error by inserting a rotating shaft of a driving motor into a turntable assembly with significantly high precision.

To achieve the above object of the present invention, an apparatus for automatically press-fitting a turntable includes a driving motor fixing part for installing a driving motor to be attachable/detachable state. Also, a turntable assembly fixing part for attachably/detachably installing a turntable assembly has a center arranged at an extending line of a motor shaft of said driving motor to permit a rotating shaft of said turntable assembly to be accurately coaxial with said driving motor when the turntable assembly is installed thereto. A motor shaft fixing part installed to an upper portion of a drive chassis coupled onto the driving motor for fixing the motor shaft includes a stand portion which is arranged to an upper portion of the driving motor and formed with an elongated guide hole capable of receiving/separating the motor shaft, and a motor shaft supporting portion which has a sidewall upwardly bent to perpendicularly extend from an edge of the elongated guide hole of the stand portion for supporting the motor shaft by closely contacting the motor shaft when the motor shaft is inserted.

Here, the motor shaft fixing part is formed to be attachable/detachable to/from the driving motor part by a magnetic force.

Preferably, the turntable fixing part is formed with an insertion lug at the lower surface thereof for being inserted/separated into/from a groove installed in an upper corresponding surface of a turntable portion, so that the turntable is firmly coupled to the turntable assembly fixing part when the driving motor shaft is press-fitted into the turntable assembly.

While the driving motor shaft is press-fitted into the turntable assembly, a permanent magnet is installed to the lower portion of the turntable attached to the lower portion of the turntable assembly fixing part for securely attaching the turntable assembly to the turntable assembly fixing part.

It is preferable that the turntable assembly fixing part is formed with a guiding slot in the lower surface thereof. An elastic member exercising an elastic motion in the up and down direction is installed to the upper portion of the guiding slot within the turntable assembly fixing part, and guide member is installed in contact with the elastic member at the lower portion of the elastic member. The guide member consists of a flat-type upper plane capable of performing the elastic motion by contacting the elastic member within the turntable assembly, and a guide rod for being inserted into a rotating shaft part of the turntable assembly while penetrating through the guiding slot to move in the up and down direction.

The turntable assembly fixing part and motor shaft fixing part are installed such that the guide rod inserted into the rotating shaft part of the turntable assembly is exactly coaxial with the motor shaft of the driving motor.

In view of the apparatus for automatically press-fitting the turntable, while the driving motor shaft is press-fitted into the rotating shaft of the turntable assembly, the motor shaft fixing part grips around the motor shaft for preventing the shaking of the motor shaft to inhibit the warping of the motor shaft. Therefore, the skew in the axial direction of the turntable can be prevented after the press-fitting process to enhance playback accuracy when the disc is reproduced.

In addition, the assembling is carried out under the state that the rotating shaft portion of the turntable assembly and shaft portion of the driving motor are respectively gripped, so that the turntable assembly and driving motor shaft are joined with significantly high precision to further enhance the playback accuracy during the reproduction of the disc.

BRIEF DESCRIPTION OF THE DRAWINGS

The above objects and other advantages of the present invention will become more apparent by describing in detail preferred embodiments thereof with reference to the attached drawings in which:

FIG. 4 is a perspective view showing the motor shaft fixing part of the apparatus for automatically press-fitting the turntable of FIG. 3;

FIG. 6 is a sectional view showing a state that the motor driving shaft is inserted into the rotating shaft part of the turntable assembly by means of the apparatus for automatically press-fitting the turntable mounted with the turntable assembly and motor part.

DETAILED DESCRIPTION OF THE PREFERRED EMBODIMENT

Hereinbelow, an apparatus for automatically press-fitting a turntable according to the present invention will be described with reference to the accompanying drawings in detail.

Figure 1:
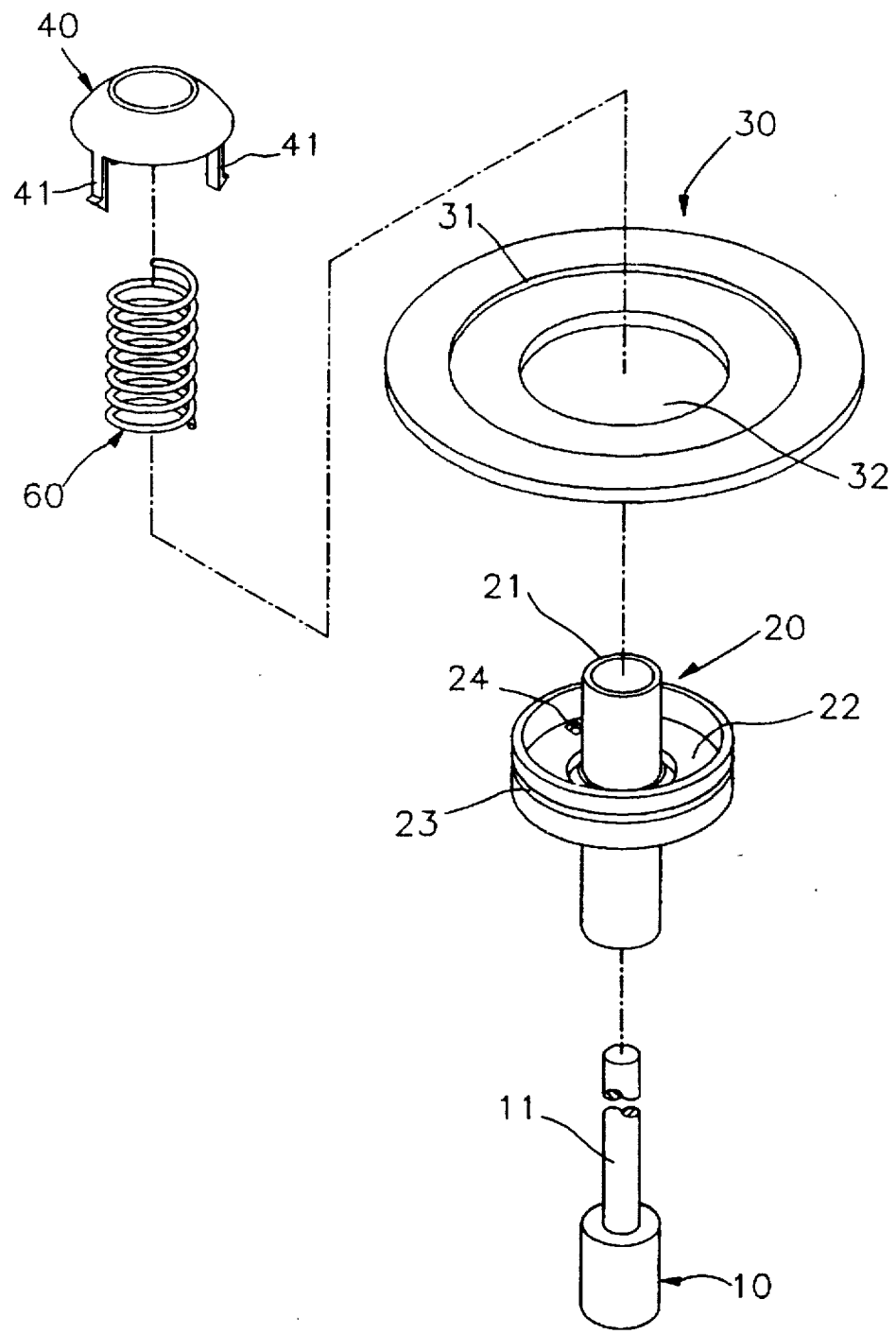
FIG. 1 is an exploded perspective view showing a conventional turntable assembly.
Figure 2:
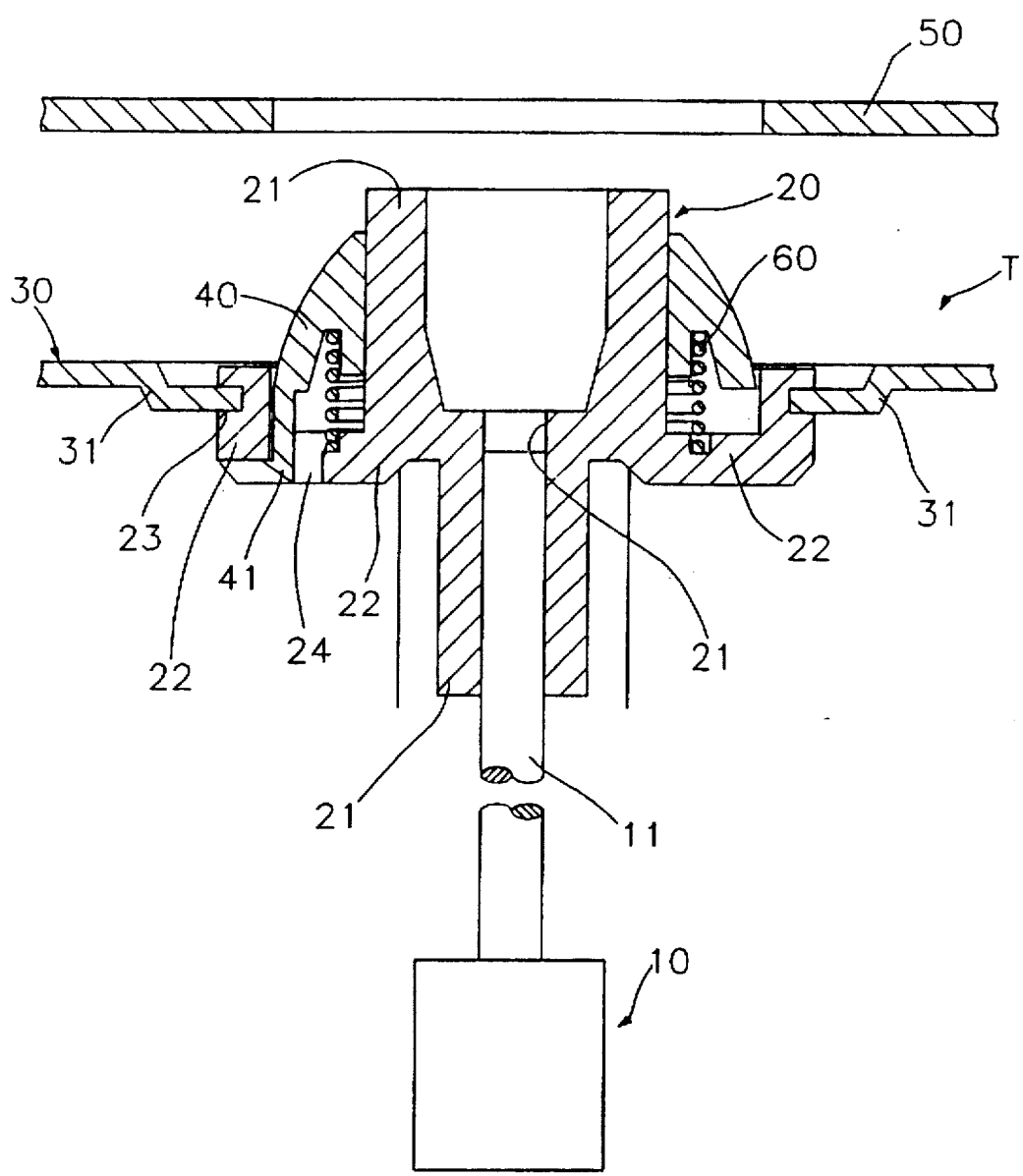
FIG. 2 is a sectional view showing a state of press-fitting the conventional turntable assembly into the driving motor.
Figure 3:
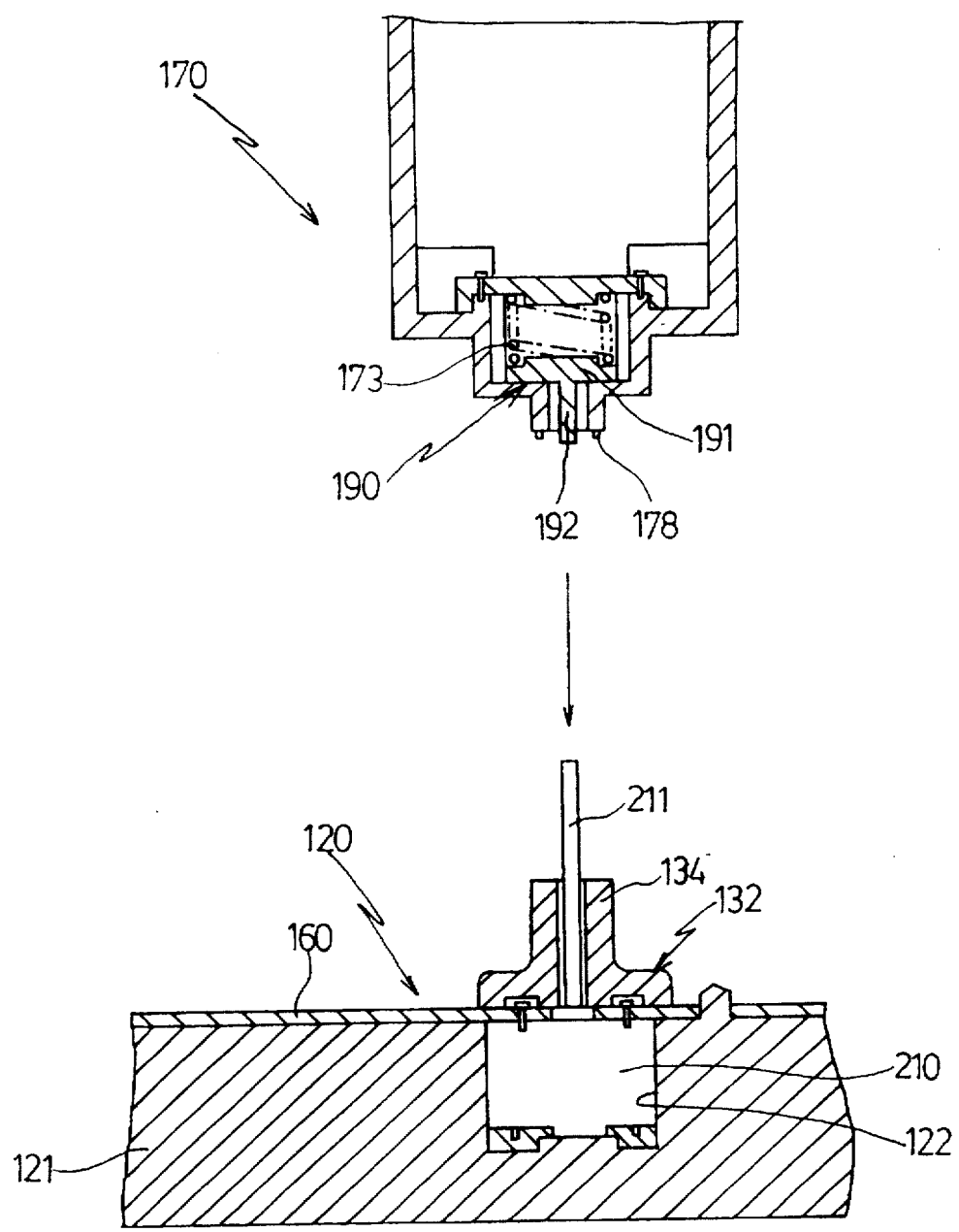
FIG. 3 is a diagrammatic section view showing an apparatus for automatically press-fitting a turntable according to the present invention.
Figure 5:
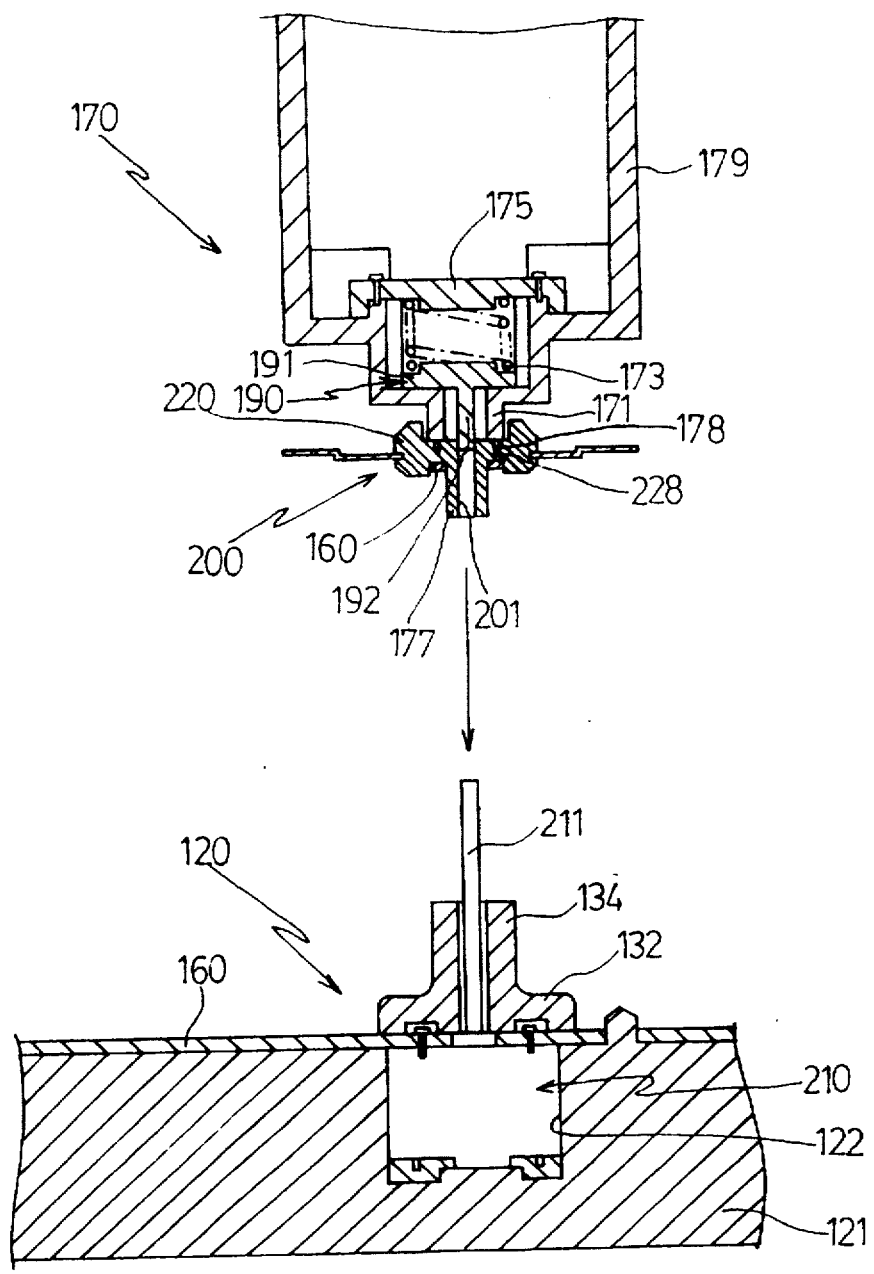
FIG. 5 is a sectional view showing a state that the turntable assembly and motor part are mounted to the apparatus for automatically press-fitting the turntable shown in FIG. 3 for inserting the motor driving shaft into the rotating shaft part of the turntable assembly.

FIG. 3 is a diagrammatic section view showing the apparatus for automatically press-fitting the turntable according to the present invention, and FIG. 4 is a perspective view showing the motor shaft fixing part of the apparatus for automatically press-fitting the turntable of FIG. 3. FIG. 5 is a sectional view showing a state that the turntable assembly and motor part are mounted to the apparatus for automatically press-fitting the turntable shown in FIG. 3 for inserting the motor driving shaft into the rotating shaft part of the turntable assembly.

As illustrated in FIGS. 3 to 5, a reference numeral 120 denotes a driving motor fixing part for installing a driving motor 210 to be attachable/detachable to/from the interior thereof. Motor fixing part 120 is formed with a spindle motor installing groove 122 into which a spindle motor 210 is inserted.

A drive chassis 160 is provided for arranging a turntable assembly 200 joined with spindle motor 210 on the upper plane thereof when a disc is recorded/reproduced. Spindle motor 210 is screw-coupled to the lower portion of drive chassis 160 in such a manner that a motor shaft 211 of spindle motor 210 penetrates through drive chassis 160 to upwardly project in the vertical direction. Drive chassis 160 is installed onto a base 121 of motor fixing part 120 under the state that spindle motor 210 joined at the lower portion of drive chassis 160 is installed to spindle motor installing groove 122.

While spindle motor 210 is screw-coupled to drive chassis 160, spindle motor 210 is inserted into spindle motor installing groove 122 of motor fixing part 120 provided to the lower portion of spindle motor 210.

A motor shaft fixing part 130 is attachably/detachably installed to the upper portion of drive chassis 160 coupled onto driving motor 210. A stand 132 of motor shaft fixing part 130 is installed to the upper portion of driving motor 210, and formed with an elongated guide hole 136. A sidewall bent to perpendicularly extend to the upward direction from an edge of elongated guide hole 136 of stand 132 is provided to the upper portion of stand 132 to form a motor shaft supporting part 134 in a body for supporting motor shaft 211 by closely contacting motor shaft 211 when motor shaft 211 is inserted.

A turntable assembly fixing part 170 is for attachably/detachably installing turntable assembly 200. Turntable assembly fixing part 170 allows the central axis thereof to be correctly arranged onto an extending line of driving motor shaft 211. By doing so, a rotating shaft 201 of turntable assembly 200 becomes exactly coaxial with motor shaft 211 of driving motor 210 when turntable assembly 200 is installed.

Turntable assembly fixing part 170 has an annular projection 171 inserted with a supporting shaft member 220 of turntable assembly 200 at the lower portion of the central axis thereof. Also, a guiding slot 172 for permitting annular projection 171 to pierce therethrough in the up and down direction is formed in turntable assembly fixing part 170. An elastic spring 173 is installed to the upper portion of guiding slot 172 within turntable assembly fixing part 170 to perform the elastic motion in the up and down direction.

An upper wall 175 is installed over the upper portion of elastic spring 173 to fix an upper end of elastic spring 173, and a guide pin 190 having a T-shaped section is installed to contact a lower end of elastic spring 173. Guide pin 190 is formed by a flat-type upper plane 191 and a guide rod 192 integrally connected with upper plane 191. Upper plane 191 of guide pin 190 is arranged in contact with the lower end of elastic spring 173 to be movable up and down within turntable assembly fixing part 170 dependent upon the elastic motion of elastic spring 173. Guide rod 192 of guide pin 190 is formed with upper plane 191 in a body, and inserted into rotating shaft 201 of turntable assembly 200 while moving up and down by piercing through guiding slot 172.

Thus, guide pin 190 arranged to exactly correspond guiding slot 172 of turntable assembly fixing part 170 to guide rod 192 is fitted into supporting shaft member 220 of turntable assembly 210. Accordingly, turntable assembly 210 can keep the balance rarely involving any error.

Turntable assembly fixing part 170 is formed with an insertion lug 178 to the lower plane of annular projection 171 which contacts the upper surface of a turntable when mounting turntable assembly 200. A groove 179 is formed in the upper corresponding surface of the turntable portion for receiving/separating insertion lug 178. By this construction, turntable assembly 200 is firmly joined to turntable assembly fixing part 170 while driving motor shaft 211 is press-fitted into turntable assembly 200.

A permanent magnet 140 is installed to the lower portion of the turntable attached to turntable assembly fixing part 170 in the process of press-fitting driving motor shaft 211 into turntable assembly 200, thereby securely attaching turntable assembly 200 to turntable assembly fixing part 170.

A guide bearing 177 is installed to the sidewall of guiding slot 172 of turntable assembly fixing part 170 for facilitating the up and down motion of guide pin 190.

A reference numeral 179 denotes an ascending gripping member for gripping to allow turntable assembly fixing part 170 which is to be mounted with turntable assembly 170 to move up and down.

Now, an operation of the apparatus for automatically press-fitting the turntable will be described.

FIG. 5 is the sectional view showing the state that the turntable assembly and motor part are mounted to the apparatus for automatically press-fitting the turntable shown in FIG. 3 for inserting the motor driving shaft to the rotating shaft part of the turntable assembly. FIG. 6 is a sectional view showing a state that the motor driving shaft is inserted to the rotating shaft part of the turntable assembly by means of the apparatus for automatically press-fitting the turntable mounted with the turntable assembly and motor part.

As shown in FIG. 5, in order to insert motor shaft 211 of driving motor 210 within supporting shaft member 220 of turntable assembly 200, supporting shaft member 220 of turntable assembly 200 is primarily fitted into annular projection 171 of turntable fixing member 170. At this time, the end of guide pin 190 protruding from annular projection 171 after piercing through guiding slot 172 is inserted into rotating shaft 201 of turntable assembly 200, thereby accurately keeping the balance of turntable assembly 200. Then, turntable assembly 200 is joined by the magnetic force of turntable assembly fixing part 170.

Meantime, insertion lug 178 formed to the lower plane of annular projection 171 of turntable assembly fixing part 170 is fitted into groove 179 formed in the corresponding portion of the upper surface of the turntable. Thus, turntable assembly 200 is more firmly joined to turntable assembly fixing part 170.

Permanent magnet 140 is installed to the lower portion of the turntable attached to the lower portion of turntable assembly fixing part 170 to securely attach turntable assembly 200 to turntable assembly fixing part 170.

While motor shaft 211 of spindle motor 210 upwardly protrudes in the vertical direction by piercing through a motor shaft thruhole of drive chassis 160, spindle motor 210 is screw-coupled to drive chassis 160.

Under the state that spindle motor 210 is screw-coupled to drive chassis 160, spindle motor 210 is inserted into spindle motor installing groove 122 of motor fixing part 120 provided to the lower portion of spindle motor 210. Thereafter, motor fixing part 120 fixes driving motor 210 and drive chassis 160 installed with motor shaft 211 of driving motor 210 by means of a magnetic force.

Motor shaft fixing part 130 is attachably/detachably installed to the upper portion of drive chassis 160 coupled onto driving motor 210 by means of the magnetic force. Then, spindle motor shaft 211 is inserted along the sidewall of motor shaft supporting part 134 of motor shaft fixing part 130. By thoroughly inserting motor shaft 121 into motor shaft supporting part 134, motor shaft 211 is supported by motor shaft supporting part 134 in the whole direction excluding the inserting direction.

After this, when turntable assembly 200 descends by ascending gripping member 179 of turntable assembly fixing part 170, rotating shaft 201 of turntable assembly 200 meets the upper end of motor shaft 211. By continuously descending turntable assembly 200, motor shaft 211 is inserted into rotating shaft 201.

Since rotating shaft 201 of turntable assembly 200 is accurately coaxial with motor shaft 211 of driving motor 210, motor shaft 211 is inserted to exactly correspond to supporting shaft member 220 of turntable assembly 200.

Successively, motor shaft 211 upwardly pushes guiding slot 172 and guide pin 190 having the T-shaped section movable up and down within guiding slot 172 of turntable fixing member 170. Here, the central axis of guide pin 190 is accurately coaxial with motor shaft 211 of driving motor 210.

Therefore, as shown in FIG. 6, guide member 190 is continuously pushed upward by motor shaft 211 and motor shaft 211 of driving motor 210 is completely inserted within supporting shaft member 220 of turntable assembly 200 while constricting spring 173 at the upper portion thereof.

The continuous descending of turntable assembly fixing part 170 further inserts spindle motor 210, and, therefore, guide rod 192 and insertion projection 178 are upwardly biased to be drawn out from turntable assembly 200. Accordingly, turntable assembly fixing part 200 is separated from turntable assembly 200.

Then, turntable assembly fixing part 170 ascends to the original position thereof by ascending gripping member 179. At this time, guide member 190 returns to the original state by the restoring force of elastic spring 173.

By doing so, the press-fitting of driving motor 210 with respect to turntable assembly 200 is completed.

Driving motor 210 installed to drive chassis 160 and turntable assembly 200 press-fitted into motor shaft 211 of driving motor 210 according to the above-described process are employed as one constituent during manufacturing an optical disc player.

In the apparatus for automatically press-fitting the turntable constructed as above, when the driving motor shaft is press-fitted into the rotating shaft portion of the turntable assembly, the motor shaft is held to be gripped by the motor shaft fixing part around the motor shaft not to be shaken. As the result, the warpage of the motor shaft caused by the press-fitting force in the axial direction is prevented to inhibit the skew in the axial direction of the turntable after finishing the press-fitting process, thereby raising playback accuracy during the reproduction of the disc.

Additionally, the joining of the rotating shaft part of the turntable assembly and shaft part of the driving motor is carried out with the significantly high precision while being respectively settling them to further raise playback accuracy during the reproduction of the disc.

While the present invention has been particularly shown and described with reference to particular embodiment thereof, it will be understood by those skilled in the art that various changes in form and details may be effected therein without departing from the spirit and scope of the invention as defined by the appended claims.

What is claimed is:

1. An apparatus for automatically press-fitting a turntable comprising:

a driving motor fixing part for installing a driving motor to be attachable/detachable state;

a turntable assembly fixing part for attachably/detachably installing a turntable assembly having a center arranged at an extending line of a motor shaft of said driving motor to permit a rotating shaft of said turntable assembly to be accurately coaxial with said driving motor when said turntable assembly is installed thereto; and a motor shaft fixing part installed to an upper portion of a drive chassis coupled onto said driving motor for fixing said motor shaft, including a stand portion arranged to an upper portion of said driving motor and formed with an elongated guide hole capable of receiving/separating said motor shaft, and a motor shaft supporting portion having a sidewall upwardly bent to perpendicularly extend from an edge of said elongated guide hole of said stand portion for supporting said motor shaft by closely contacting said motor shaft when said motor shaft is inserted.

2. The apparatus for automatically press-fitting a turntable as claimed in claim 1, wherein said motor shaft fixing part is formed to be attachable/detachable to/from said driving motor part by a magnetic force.

3. The apparatus for automatically press-fitting a turntable as claimed in claim 1, wherein said turntable fixing part is formed with an insertion lug at the lower surface thereof for being inserted/separated into/from a groove installed in an upper corresponding surface of a turntable portion to permit said turntable to firmly couple to said turntable assembly fixing part when said driving motor shaft is press-fitted into said turntable assembly.

4. The apparatus for automatically press-fitting a turntable as claimed in claim 1, wherein a permanent magnet is installed to the lower portion of said turntable attached to the lower portion of said turntable assembly fixing part for securely attaching said turntable assembly to said turntable assembly fixing part when said driving motor shaft is press-fitted into said turntable assembly.

5. The apparatus for automatically press-fitting a turntable as claimed in claim 1, wherein said turntable assembly fixing part comprises a guiding slot in the lower surface thereof and a guide member formed with a guide rod for being inserted into a rotating shaft portion of said turntable assembly while penetrating through said guiding slot to move in the up and down direction.

6. The apparatus for automatically press-fitting a turntable as claimed in claim 1, wherein an elastic member exercising an elastic motion in the up and down direction is installed to the upper portion of said guiding slot within said turntable assembly fixing part, and said guide member is installed in contact with said elastic member at the lower portion of said elastic member for executing the elastic motion by contacting said elastic member within said turntable assembly.

7. An apparatus for automatically press-fitting a turntable comprising:

a driving motor fixing part for installing a driving motor to be attachable/detachable state;

a turntable assembly fixing part for attachably/detachably installing a turntable assembly having a center arranged at an extending line of a motor shaft of said driving motor to permit a rotating shaft of said turntable assembly to be accurately coaxial with said driving motor when said turntable assembly is installed thereto, an insertion lug formed at the lower surface thereof for being inserted/separated into/from a groove installed in an upper corresponding surface of a turntable portion to permit said turntable to firmly couple to said turntable assembly fixing part when said driving motor shaft is press-fitted into said turntable assembly; and a motor shaft fixing part installed to an upper portion of a drive chassis coupled onto said driving motor for fixing said motor shaft and being attachable/detachable to/from said driving motor part by means of a magnetic force, including a stand portion arranged to an upper portion of said driving motor and formed with an elongated guide hole capable of receiving/separating said motor shaft, and a motor shaft supporting portion having a sidewall upwardly bent to perpendicularly extend from an edge of said elongated guide hole of said stand portion for supporting said motor shaft by closely contacting said motor shaft when said motor shaft is inserted.

8. An apparatus for automatically press-fitting a turntable comprising:

a driving motor fixing part for installing a driving motor to be attachable/detachable state;

a turntable assembly fixing part for attachably/detachably installing a turntable assembly having a center arranged at an extending line of a motor shaft of said driving motor to permit a rotating shaft of said turntable assembly to be accurately coaxial with said driving motor when said turntable assembly is installed thereto, and a permanent magnet installed to the lower portion of said turntable attached to the lower portion of said turntable assembly fixing part for securely attaching said turntable assembly to said turntable assembly fixing part when said driving motor shaft is press-fitted into said turntable assembly; and a motor shaft fixing part installed to an upper portion of a drive chassis coupled onto said driving motor for fixing said motor shaft and being attachable/detachable to/from said driving motor part by means of a magnetic force, including a stand portion arranged to an upper portion of said driving motor and formed with an elongated guide hole capable of receiving/separating said motor shaft, and a motor shaft supporting portion having a sidewall upwardly bent to perpendicularly extend from an edge of said elongated guide hole of said stand portion for supporting said motor shaft by closely contacting said motor shaft when said motor shaft is inserted.

\* \* \* \* \*